United States Patent [19]

Karn

[11] 4,263,017
[45] Apr. 21, 1981

[54] PERMEABLE MEMBRANE ASSEMBLY

[76] Inventor: William S. Karn, 518 Dickson Ave., Pittsburgh, Pa. 15202

[21] Appl. No.: 116,938

[22] Filed: Jan. 30, 1980

[51] Int. Cl.$^3$ .................... B01D 53/22; B01D 31/00
[52] U.S. Cl. .......................................... 55/16; 55/158; 210/651; 210/506; 210/321.2; 210/494.1
[58] Field of Search .............. 55/16, 158; 156/182, 156/253, 290; 204/180, 252, 253, 257, 296; 210/321 R, 321 A, 321 B, 494 M, 506; 264/285, 339

[56] References Cited

U.S. PATENT DOCUMENTS

| | | | |
|---|---|---|---|
| 3,252,272 | 5/1966 | Hazen et al. | 55/158 |
| 3,332,216 | 7/1967 | Stern | 55/158 |
| 3,355,861 | 12/1967 | Webb | 55/158 |
| 3,397,790 | 8/1968 | Newby et al. | 55/158 X |
| 3,447,286 | 6/1969 | Dounoucos | 55/16 |
| 3,668,837 | 6/1972 | Gross | 55/158 |
| 3,872,014 | 3/1975 | Schell | 55/158 X |
| 3,892,533 | 7/1975 | Freedman et al. | 55/158 X |
| 4,025,425 | 5/1977 | Croopnick et al. | 55/16 X |
| 4,197,206 | 4/1980 | Karn | 210/321 A |

*Primary Examiner*—Robert H. Spitzer
*Attorney, Agent, or Firm*—William S. Karn

[57] ABSTRACT

The permeable membrane assemblies disclosed in this application utilize the bi-leaf edge membrane concept and the lay-flat tubing connector concept presented in prior and pending patents for ionic systems. Herein these concepts are shown and claimed for their utility in transfer systems in general including selective transfer of gaseous fluids and liquid fluids whether ionic or not as well as for transfer of heat. As before the concepts offer advantages of simplicity and reliability and offer economical assembly in leak free equipment. Countercurrent flow of the fluids is obtained. Hydrogen separation from mixed gases is one application. The full range of dialysis and fluid to fluid extraction processes are prospective candidates for these design concepts.

11 Claims, 8 Drawing Figures

FIGURE 5
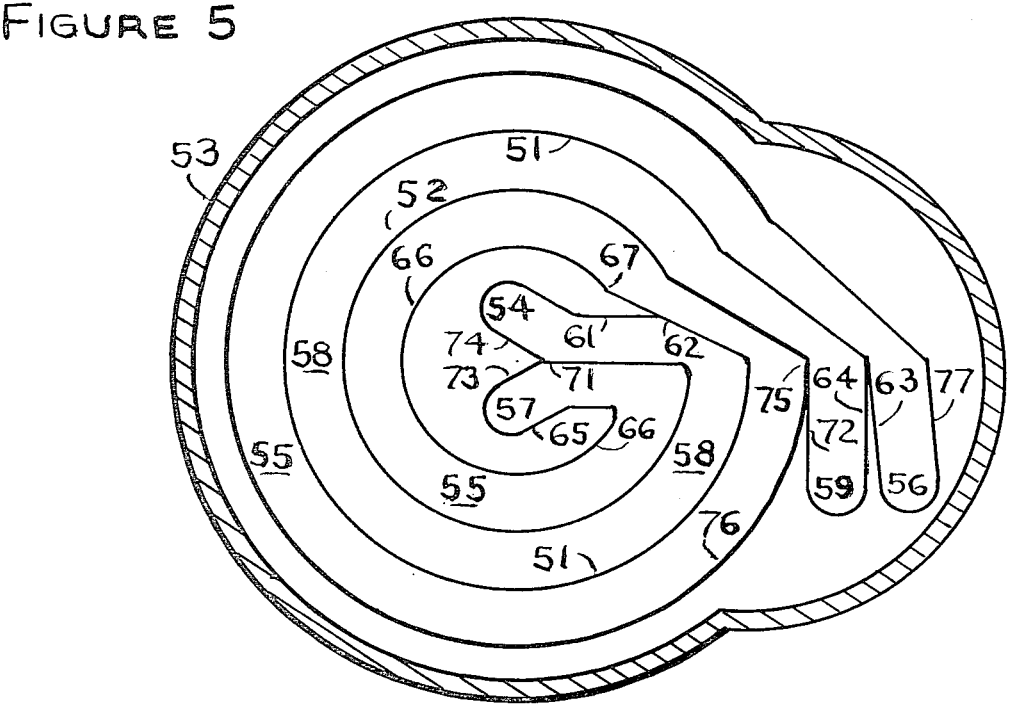
FIGURE 6
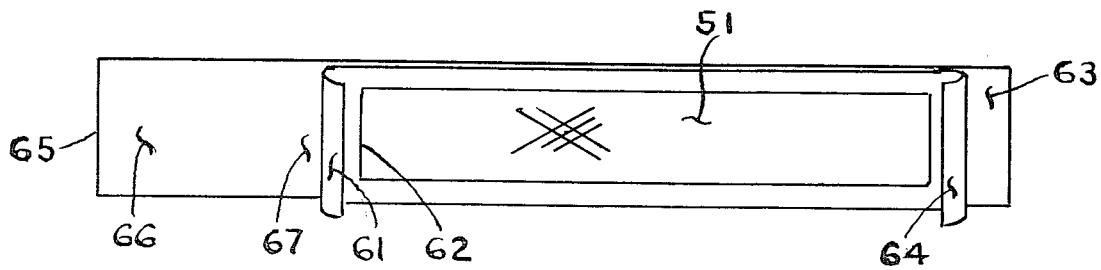
FIGURE 7
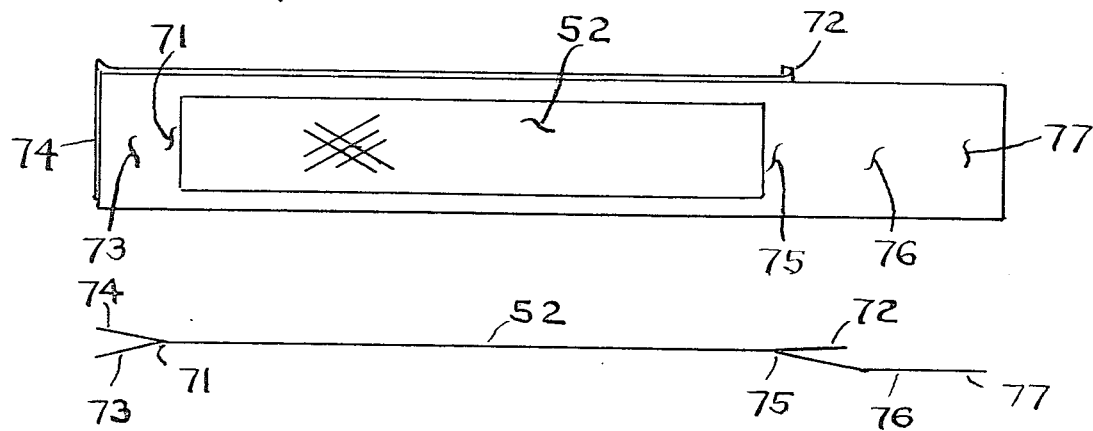
FIGURE 8

PERMEABLE MEMBRANE ASSEMBLY

CROSS-REFERENCES TO RELATED APPLICATIONS

Karn patents soon to issue per application Ser. No. 941,966 of filing date Sept. 13, 1978 of title HEAT SEALABLE ION PERMEABLE MEMBRANES, now U.S. Pat. No. 4,197,206, and per application Ser. No. 041,937 of filing date May 24, 1979 of title SPIRAL WOUND ELECTRODIALYSIS CELL, now U.S. Pat. No. 4,225,413.

OTHER REFERENCES & PRIOR ART

Nov. 26, 1979 CHEMICAL & ENGINEERING NEWS (Volume 57, Number 48) pages 26 & 27 being an advertisment by Monsanto Company of hydrogen separation by bundled hollow fiber membranes. Similar news item in Dec. 3, 1979 CHEMICAL ENGINEERING (Volume 86, Number 26) page 43.

Pages 175 thru 177 of 4th International Symposium of Fresh Water from the Sea, vol. 4, 1973 describing Donnan water softening method.

BRIEF SUMMARY OF THE INVENTION

An object of this invention is to take from previous patent application disclosures for electrodialysis and reverse osmosis the assembly concept of a membrane with a bi-leaf edge and the assembly concept of the lay-flat tubing connector to adapt them to the broader application of membrane transfer processes in general.

Another object of this invention is to adapt said bi-leaf edge concept and said lay-flat tubing connector concept to transfer of heat across separatory membranes.

Another object of this invention is to adapt said assembly concepts to equipment to separate hydrogen gas from mixed gas streams.

Another object of this invention is to fabricate dialysis equipment or liquid thru intervening membrane to liquid extraction equipment wherein said equipment is readily sealed free of leaks and is economically fabricated.

Another object of this invention is to fabricate economical and reliable equipment for effecting mass transfer across a membrane wall of a component from one fluid stream to another fluid stream without problems due to phase difference between the two streams or due to reactivity between the two streams.

BRIEF DESCRIPTION OF THE DRAWING

The drawings are abstracted from the above referenced prior patent application of the inventor. Such prior disclosed details are incorporated herein by reference.

FIG. 5 is a section view across the cylindrical axis of a spiral wound assembly of a bi-leaf film system.

FIG. 6 is a flat view of one membrane composite.

FIG. 7 is a flat view of a second membrane composite.

FIG. 8 is a section view on edge of FIG. 7 showing bi-leaf edge detail.

DETAILED DESCRIPTION OF THE INVENTION

Figure 1:
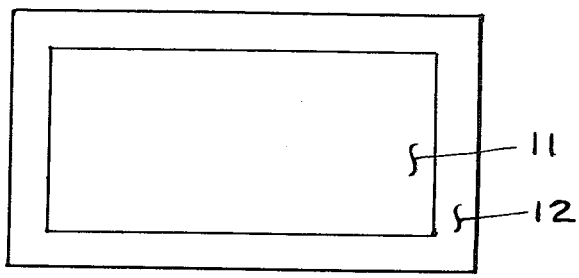
FIG. 1 shows the membrane composite having a central region and having a border region.

The group of inventive concepts contained in this patent application was inspired by the magazine advertisement and magazine announcement cited above regarding hollow fiber membranes. There is an analogy of uses between hollow fiber membranes and flat sheet membranes. Given a successful application of the fiber configuration one may quickly find the equivalent flat sheet configuration.

In reverse osmosis there are two prominent equipment design concepts. One arrangement is to use a bundle of hollow fibers the ends of which are connected to a common tube sheet header like in a shell and tube heat exchanger. The other arrangement is to use a flat tubular envelope with end connectors which envelope is wound into a spiral and contained within a cylindrical pipe.

The inventor herein on previous patent applications disclosed his concept of using ion selective semipermeable membranes in electrodialysis equipment wherein the membrane border region remained unaltered in composition so as to be readily sealable to itself. That feature alone was of questioned novelty over prior art. However, a further novel concept was to make a bi-leaf edge around the membrane for sealing membranes together. This concept added considerable utility in fabricating an electrodialysis membrane array or a reverse osmosis assembly.

Such equipment assembly design improvements are not limited to reverse osmosis and electrodialysis. The design improvements add value to any equipment wherein the configurations of equipment are similar in appearance to the original equipment invention. With this background one may scrutinize the various hollow fiber applications to design the equivalent improved flat sheet membrane design.

The Monsanto Company separation equipment for recovering hydrogen from a mixed gas stream appears to be almost identical in appearance and identical in separatory hollow fiber membrane composition to that reverse osmosis equipment suitable for desalting sea water. The only essential change is that Monsanto runs gas streams instead of liquid streams.

The inventor herein claims the same capability for his equipment. Example I below reduces this application to a more formal statement of practice.

The next striking usage of the bundled fiber configuration that comes to mind is the spaghetti like bundle of fluoropolymer tubing that is used in corrosion resistant heat exchangers. The inventor herein claims the same capability for his equipment. Example II below reduces this application to a more formal statement of practice.

The next prior art usage that comes to mind is dialysis in general. That art has been practiced in the past with both hollow fiber membranes and with sheet membranes. One improvement offered by the instant invention for general dialysis usage is that of easy economical assembly with possibility of countercurrent flow over almost the entire length of passage of the fluids being processed rather than a compromised flow pattern of cross current flow. Example III below reduces this application to a more formal statement of practice.

Another variation that comes to mind is to have a fluid of one phase (e.g. gaseous) on one side of the permeable membrane and a fluid of the other phase (i.e. liquid) on the other side of the permeable membrane. Example IV below presents a practical demonstration of this possibility.

DEFINITION OF TERMS

Although the entire description section of this application and the cited cross-references are intended to clarify and support the claims wording, certain word structures are explicitly detailed here. In a numerical recitation of each portion of a drawing it is sometimes my choice to use the word "piece" or the word "part" designating means elements. The word part or piece is used to set off the numeral as being of the drawing components identification. The word part or piece also means that such region of the drawing portrays a subfunction within the total means function of the drawing. A part or piece is not necessarily physically detachable any more than a piece of land can be detached from the total earth.

A membrane or a film described herein is as broad in word usage as the dictionary meaning but tends to be applied to plastic films especially thermoplastic such as the polyolefins, the fluorocarbon polymers, vinyls, polysulfones, etc. ranging roughly from ½ mil to 10 mil thickness.

It is obvious that a piece of film or membrane having extent but having limited extent must then have a central region and a border region or a boundary region. The word composite draws attention to the existance of these two regions. Whether the two regions in some examples be of identical physical and chemical composition to one another or not, such fact does not rule out the use of the word composite to embrace the full range of possibilities.

For selective permeation of ions or selective diffusion of fluids the central region of a membrane may appropriately be altered from the composition of the border region. The function of the central region is that of transfer while the funcion of the border region is that of bonding a leak free assembly. However, some film compositions have both good bonding qualities and appropriate transfer characteristics. In that case the central region and border region would be of the same composition. That is valid in the case of heat transfer. That is sometimes valid in the case of gas transfer by permeation.

The words "integral margin frame" are used to describe the border region around the membrane which is used for sealing membranes together for making a compartment. By making the margin frame double or bi-leaf in aspect it is practical to join a stack of membranes together at the edge somewhat in the manner of an accordian bellows pleat.

A detailed enumeration of the parts of the drawing now follows.

FIG. 1 is a membrane composite having central region part 11 and border region part 12.

Figure 2:
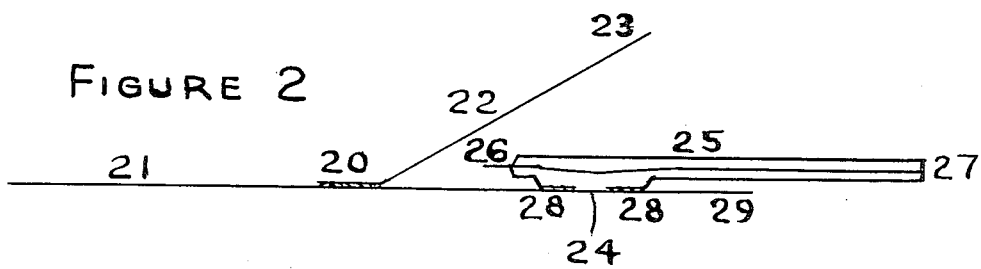
FIG. 2 illustrates the addition of a bi-leaf border to a film membrane and also illustrates addition of a flow port connection to the integral margin frame boundary region.

FIG. 2 shows membrane central region 21 bounded by border region 22 and bounded by border region spanning parts 20, 24, 28, and 29. The two borders join to the central region along the region designated part 20. The lay-flat tubing is illustrated as part 25 which is joined to border spanning 20, 24, 28, 29 at a lap-bonded region designated part 28 about fluid flow passage hole designated part 24. Part 27 is the open end of the lay-flat tubing and part 26 is the sealed off end of the lay-flat tubing. It is along border regions 23 and 29 that sealing is effected to join the membrane to adjacent membranes to form compartments.

Figure 3:
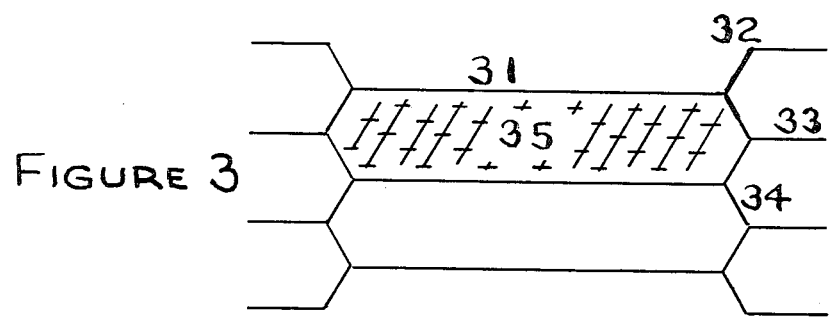
FIG. 3 illustrates using the bi-leaf membrane composite in a series of sealed membranes in the manner of an accordion bellows.

FIG. 3 shows a manner of stacking a series of membranes designated part 31 as membrane central region and parts 32 and 33 as membrane border regions. Border regions part 33 show the bonding region which joins successive layers of membranes together. Part 34 is the membrane border region that forms the external wall region of a compartment and to which may be attached the fluid connector described in FIG. 2. Part 35 is the means provided to prevent collapse of the compartment. One preferred embodiment for part 35 is a mat of synthetic fiber felt or alternately a thick woven cloth of synthetic fiber. Part 35 also serves as a distributor for fluid flowing thru the compartment.

Figure 4:
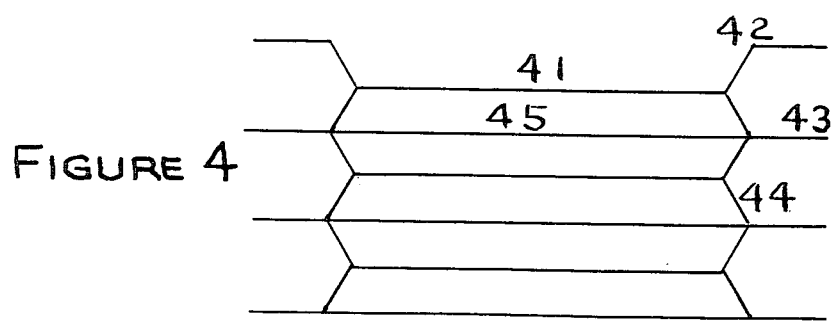
FIG. 4 is a variation of FIG. 3 using alternately a bi-leaf membrane and a single leaf membrane.

FIG. 4 shows part 41 membrane central region corresponding to part 31 and shows parts 42 and 43 as membrane border regions corresponding to 32 and 33. Border regions parts 43 show the bonding region which joins successive layers of membranes together. However, in this figure the part 45 is a single border leaf membrane. It is sufficient to make every other one of the membranes bi-leaf in aspect and then bond three edge layers together at part 43 instead of bonding two edge layers together at part 33.

Part 44 is the membrane border region that forms the external wall region of a compartment and to which may be attached the fluid connector described in FIG. 2.

FIG. 5 shows a spiral wound array of membranes wherein part 51 is one membrane and part 52 is another membrane which membranes are joined at their edges into a pouch. The pouch is wound into a spiral and placed within containing shell part 53. Numeral 55 designates the pouch flow passage formed by joining part 51 to part 52. The flow passage at the outside of the spiral terminates at fluid connector part 56 and on the inside of the spiral terminates at fluid connector part 57. Once wound into the spiral the other leaf of the bi-leaf membranes 51 and 52 may be joined to its neighbor to form a second passage in the spiral designated part 58. The spiral passage part 58 at the outside of the spiral terminates at fluid connector part 59 and on the inside of the spiral terminates at fluid connector part 54. The fluid passages 55 and 58 are kept from collapsing by a porous filler and distributor. One preferred embodiment for a filler in passages 55 and 58 is a mat of synthetic fiber felt or alternately a thick woven cloth of synthetic fiber.

FIGS. 6, 7, and 8 show in more detail the design of the membrane composite. A bi-leaf design is illustrated.

A careful study of FIGS. 5, 6, 7, and 8 with a tracing of the path of the membranes from the core outward will show the sealing requirements across the membrane composites. In FIGS. 6 and 7 the membrane central regions marked 51 and marked 52 may be identical in composition to the border regions parts 63, 64, 66, 61 and parts 73, 74, 77, 72 or the central regions may be different for preferred transfer characteristics.

One may trace the spiral starting in the hub region with membrane composite of FIG. 6 at point 65. Material 66 winds around until reaching region 67 where a bi-leaf edge at point 62 splits off to reenter the hub region. Continuing outward along the spiral the material 51 reaches another bi-leaf edge with branches designated 63 and 64. Starting in the center again with the membrane composite of FIG. 7 the bi-leaf edges designated 73 and 74 pass away from the hub to join together at region 71, which region joins membrane central region material designated 52. Material 52 spirals outward until reaching 75 and 72 where bi-leaf edge 72 splits off to form a peripherial port 59. Central region membrane material designated part 76 continues from 75 one more spiral turn to reach region 77 to form a second peripherial port 56. Back in the core the end leaves 61 and 74 are joined to form port designated 54. End leaves 65 and 73 are joined to form port designated 57. The rest of the membrane peripheries are closed with one another by their adjacent bi-leaf edges.

The region marked 55 between two membranes when joined at the edges, is a pouch with ports 56 and 57. The other spiral chamber marked 58 terminates at ports 59 and 54. If the edges of this second chamber are left open, cross flow feed can be used for this feed stream. Such a flow pattern may be considered for streams that tend to cause fouling.

Although the seams can be adhesive bonded together, fusion heat sealing or reactive chemical bonding (e.g. vulcanization) is preferred. The most convenient port attachment methods are as described in FIG. 2.

Formed plastic spacers between the membranes are suitable spacers. A felted mat or woven cloth of synthetic fiber is a preferred spacer material.

EXAMPLE I

Equipment is fabricated as illustrated in FIG. 5 using chlorotrifluoroethylene (CTFE) polymer film for the membrane material. Thru one passage of the spiral wound membrane equipment is passed a gas mixure of hydrogen and carbon dioxide. Countercurrently thru the other passage is passed a stream of steam. The steam sweeps out from the equipment a permeate gas mixture. Upon condensation of the steam the permeate gas mixture yields a composition enriched in hydrogen relative to the composition of the original gas mixture.

EXAMPLE II

The above equipment of example I is fed thru one passage with a stream of cool sea water. In countercurrent flow thru the other passage is fed a stream of hot fresh water. The one effluent stream has been cooled and the other efffuent stream has been heated by the equipment heat exchanger function.

EXAMPLE III

Equipment is fabricated as illustrated in FIG. 5 using polyethylene film. The polyethylene film membranes have their central region chlorosulfonated and hydrolized per instruction of Karn patent application supra serial number 941,966 HEAT SEALABE ION PERMEABLE MEMBRANES. See also pages 175 thru 177 of 4th International Symposium of Fresh Water from the Sea, vol. 4, 1973. Thru one passage of the spiral wound membrane equipment is passed sea water. In countercurrent flow thru the other passage is fed a stream of concentrated aqueous sodium chloride solution. The effluent seawater stream is found to be depleted in scale forming calcium ions; i.e. the seawater has been softened.

EXAMPLE IV

Equipment is fabricated as illustrated in FIG. 5 using polyethylene film. Thru one passage is fed a mixture of ethyl alcohol and diethyl ether. Countercurrent thru the other passage is fed a stream of nitrogen gas. The diethyl ether permeates preferentially thru the membrane film leaving a liquid stream higher in ethyl alcohol concentration.

I claim:

1. A membrane composite excluding ion permeable membrane composites having a central region and having a border region, said membrane composite having flow port connector giving access of fluid to said membrane central region, said flow port connector being joined to and passing thru said border region, said border region being a film wherein the improvement comprises that said flow port connector is a tubular film closed at one end and lap-bonded near the closed end to a surface of said border region polymer film, a flow hole being made thru the two lap-bonded film layers and made such that the flow hole lies within the area bounded by the lap-bonded line so as to allow fluid passing thru said flow port connector to reach the face of said membrane central region.

2. An assembly of membrane composites excluding ion permeable membrane composites, each of said composites having an integral margin frame border region completely bordering the membrane central region of said membrane composite and having flow port connectors giving fluid access to faces of said membranes, said flow port connectors being joined to and passing thru said border region, said border region of one membrane composite being joined to the border region of a second membrane composite and the second membrane composite joined to the next membrane composite in a successive series of border regions so as to form a series of sealed membrane cell compartments fed by said flow port connectors wherein said assembly has a novel aggregate of features which are the apparatus design features that said border region is a film material, that said border region is sealed to said flow port connectors, that said border region is sealed to said second membrane composite border region completely around the periphery of said membrane composites, that successive membranes are so joined so as to make a multiple layer of stacked compartments, and that each of said compartments within said multiple layer of stacked compartments has its walls shared in common with its neighboring compartment.

3. The assembly of claim 2 wherein said border region film material is a polyolefin.

4. The assembly of claim 2 wherein said border region film material is a fluorocarbon polymer.

5. A membrane composite excluding ion permeable membrane composites having a central region and having a border region, said membrane composite having two integral margin frame boundary regions of film comprising said border region, each of said integral margin frame boundary regions completely bordering said central region of said membrane composite with such geometry that said composite, if viewed in any cross section cut perpendicular to the plane of the membrane fully across any portion of said central region and with a continuing of the cut fully across any portion of said two integral margin frame boundary regions along any cross section plane fully traversing said membrane composite, would present a view of a central region integrally bounded on each edge individually and jointly by said two film integral margin frame boundary regions.

6. An assembly of two membrane composites excluding ion permeable membrane composites, each of said composites comprising a membrane central region and a membrane border region, each of said composites having an integral margin frame border region completely bordering the central region of said membrane composite, said integral margin frame border region having flow port connectors giving fluid access to faces of said membranes, said flow port connectors being joined to and passing thru said border region, said border region of one membrane composite being joined to the border region of a second membrane composite so as to form a closed pouch with openings only via said flow port connectors, said pouch being spiral wound about itself wherein the improvement comprises that said border region is a film material, that said border region is sealed to said flow port connectors, and that said border region is sealed to said second membrane composite border region completely around the periphery of said membrane composites.

7. The assembly of claim 6 wherein said integral margin frame border region of said spiral wound assembly is joined to the border region of said second membrane composite so as to form a second closed pouch having membrane walls in common with first said closed pouch within the spiral configuration, said second closed pouch having flow port connectors giving fluid access to faces of said membranes wherein the improvement comprises that a second closed pouch is formed as described, that said border region is a film material, that said border region is sealed to said second membrane composite border region completely around the periphery of said membrane composites, that successive turns in said spiral wound assembly are so joined so as to make, when viewed in cross section, a multiple layer of stacked compartments, and that each of said compartments within said multiple layer of spiral stacked compartments has its compartment walls shared in common with its neighboring compartment.

8. The assembly of claim 6 wherein said assembly is within a pressure confining vessel.

9. The assembly of claim 7 wherein the improvement comprises that one of said membrane composites has two integral margin frame boundary regions of film comprising said membrane border region, each of said integral margin frame boundary regions borders completely said central region of said membrane composite with such geometry that said composite, if viewed in any cross section cut perpendicular to the plane of the membrane fully across any portion of said central region and with a continuing of the cut fully across any portion of said two integral margin frame boundary regions along any cross section plane fully traversing said membrane composite, would present a view of a central membrane region integrally bounded on each dege individually and jointly by said two film integral margin frame boundary regions.

10. The process of separating hydrogen from a mixed gas stream said process comprising the step of constructing an assembly of two membrane composites as defined in claim 6 and the step of passing said mixed gas stream across a face of said membrane central region and the step of removing a gas stream from the back side of the membrane surface opposite said face of said membrane central region whereby said gas stream being removed is enriched in hydrogen due to difference of gas permeability rates thru said membrane.

11. The process of softening water by removal of ions causing water hardness said process comprising the step of constructing an assembly of two membrane composites as defined in claim 6 wherein said membrane central region is charge selectively permeable to the water hardness ions to be removed and the step of passing said water across a face of said membrane central region and the step of passing across the back side of the membrane surface opposite said face of said membrane central region an ion transfer stream which by Donnan equilibrium mechanism causes a depletion of ions causing water hardness in the stream passing across said face of said membrane central region.

* * * * *